United States Patent [19]

Moore, Jr.

[11] 4,232,878
[45] Nov. 11, 1980

[54] APPARATUS FOR COUPLING A TRACTOR AND FARM IMPLEMENT

[76] Inventor: George E. Moore, Jr., 1906 Field, San Angelo, Tex. 76902

[21] Appl. No.: 915,455

[22] Filed: Jun. 14, 1978

[51] Int. Cl.³ .......................................... A01B 59/043
[52] U.S. Cl. ................................. 280/461 A; 172/449
[58] Field of Search .......... 280/461 A, 460 A, 456 A, 280/497, 415 A; 172/449

[56] References Cited

U.S. PATENT DOCUMENTS

| 2,346,757 | 8/1944 | Horner | 172/449 X |
| 2,573,221 | 10/1951 | Romig | 280/461 A |
| 2,712,278 | 7/1955 | Wilson | 172/449 X |
| 3,231,294 | 1/1966 | Horney | 280/415 A |
| 3,528,685 | 9/1970 | Eastman | 280/461 A |

Primary Examiner—John A. Pekar
Attorney, Agent, or Firm—Richards, Harris & Medlock

[57] ABSTRACT

A coupler unit is provided for attaching a tractor to a farm implement. The unit includes a frame pivotally attached between the farm implement and lower trailing arms extending rearwardly from the tractor. Structure is provided from the upper portion of the frame for engaging a second point on the farm implement. A coupling arm is pivotally attached at one end to the upper portion of the frame and pivotally attached at a second end to the upper trailing arm extending from the tractor.

8 Claims, 7 Drawing Figures

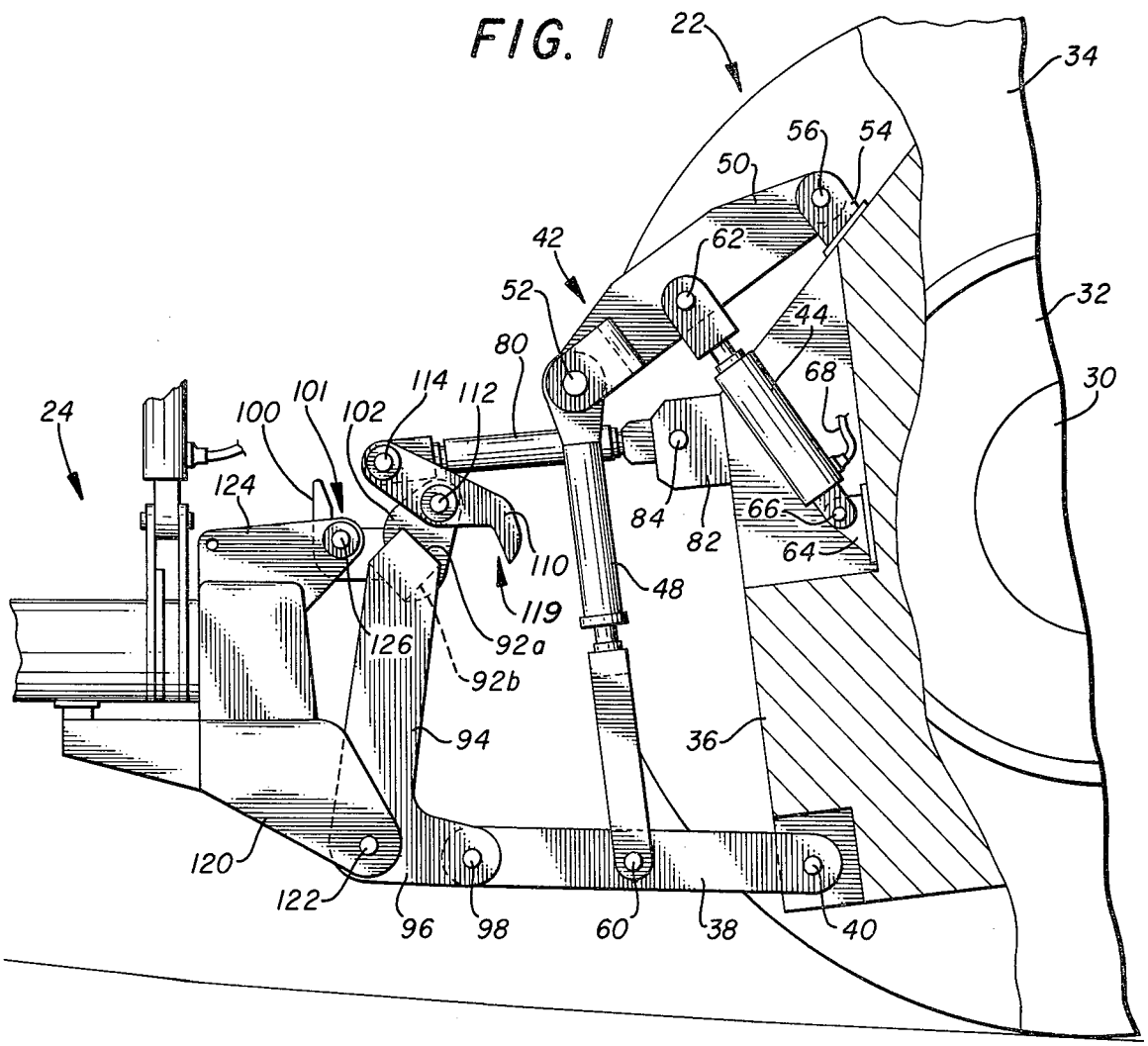
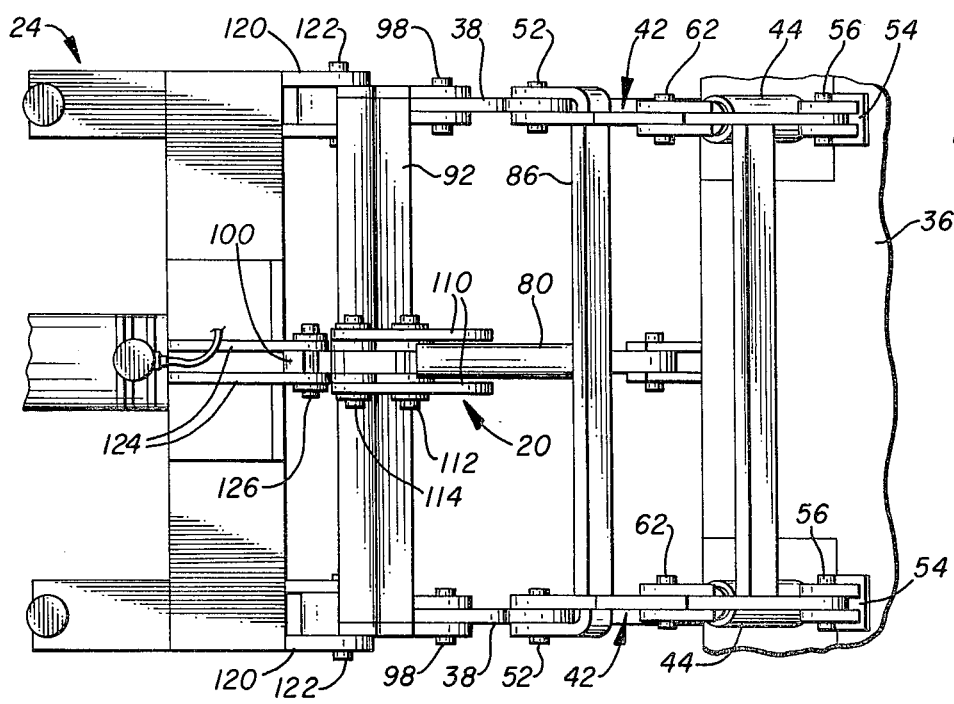

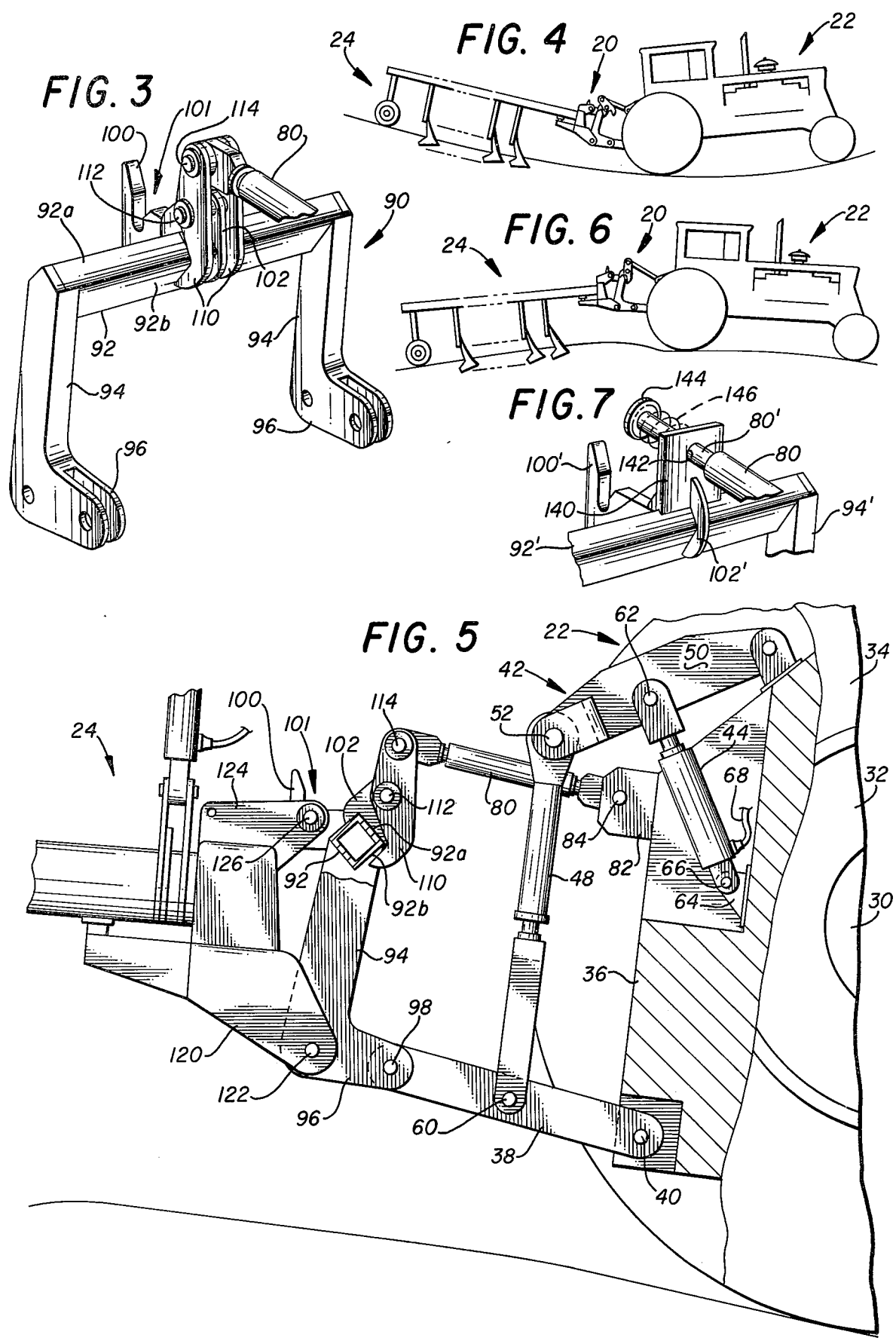

APPARATUS FOR COUPLING A TRACTOR AND FARM IMPLEMENT

BACKGROUND OF THE INVENTION

1. Field of the Invention

The present invention relates to a coupler for attaching a farm implement to a tractor.

2. Prior Art

Farm tractors are regularly used to pull various soil working or treating implements. Most tractors are fitted with a three point hookup used to attach the implement to the rear of the tractor. The three point hookup includes two vertically adjustable lower trailing arms and an upper trailing arm extending rearwardly from the tractor. The upper trailing arm is usually attached to the implement at a point above the attachment of the implement to the lower trailing arms.

The lower trailing arms are adjustable to set the height of the front end of the farm implement relative to the ground. In some configurations, the upper trailing arm is adjustable to vary the attitude of the implement relative to the ground and to the tractor. However, in other applications, the upper trailing arm serves as a stabilizer for the farm implement. For example, in bedding plows which rotate about an axis parallel to the line of travel for engaging alternative sets of plows into the soil, the upper trailing arm acts as a stabilizer for torsional loading induced by rotating the plow between its alternative positions.

Although the attachment of an implement to a tractor through both the lower and upper trailing arms provides a stable connection, this arrangement creates problems when the tractor and implement are operated over irregular terrain. Because the attachement of the implement to the tractor is fixed at three points, when the tractor and implement traverse a valley, the fixed attachment causes the implement, such as a plow, to be forced downwardly into the soil. Alternatively, as the tractor and implement traverse a crest or hill, the attachment tends to withdraw the implement out of the soil. Thus, where an implement is adjusted to the proper setting for operation over a level terrain, this setting is disturbed when the tractor and implement traverse a valley or crest in the field in which the machinery is operated.

Therefore, a need has arisen for an apparatus for attachment between a tractor and farm implement for compensating for irregularities in the terrain while permitting the three point attachment normally required between the tractor and implement.

SUMMARY OF THE INVENTION

The present invention is directed to a coupler for use between a tractor and farm implement for overcoming the deficiencies hereinabove described. The coupler may be readily used between a tractor having a three point hookup including two lower trailing arms and an upper trailing arm extending rearwardly from the tractor. The coupler includes a frame pivotally attached between the farm implement and the lower rearwardly extending arms of the tractor. Structure is provided adjacent the upper portion of the frame for releasably engaging a second point on the farm implement. A coupling arm is pivotally attached at a first point to the upper portion of the frame and pivotally attached at a second point, spaced from the first point, to the end of the upper trailing arm extending from the tractor.

The coupler attaches the farm implement to both lower trailing arms and the upper trailing arm thus providing the torsional stability provided by three point attachment between the tractor and the implement. However, a coupling arm is pivotally mounted between the upper trailing arm of the tractor and the coupler frame attached to the implement to permit movement by the implement relative to the tractor about the attachment of the coupler frame to the lower trailing arms.

In accordance with one embodiment of the invention, the coupler frame includes a U-shaped structure having an upper bar connected between two parallel legs extending transversely therefrom. The end of the transversely extending legs remote from the upper bar are attached between the farm implement and the lower trailing arms from the tractor. A rearwardly extending ear is attached from the frame for connection to the implement at a point above the connection of the implement to the ends of the transverse extending legs. An upwardly extending ear extends from the frame for rotatable engagement to the coupling arm.

In accordance with still another embodiment of the invention, the coupling arm extends beyond its attachment to the upwardly extending ear such that the extended portion is adjacent the upper bar of the frame. The extended portion rotates toward the upper bar when the farm implement rotates downwardly about the point of connection of the lower ends of the transversely extending arms to the lower trailing arms of the tractor. In this embodiment, the implement is free to rotate downwardly relative to the tractor until the extended portion of the coupling arm engages the upper bar.

In accordance with still another embodiment of the invention, the implement is attached directly to the tractor with structure for rotatably attaching the implement to the tractor at a lower point. A coupling arm attaches the implement to the tractor at an upper point. The coupling arm is rotatably attached at a first point to the tractor and rotatably attached at a second point to the farm implement. Normally, the coupling arm is attached from the tractor to the implement at points above the attachment of the implement to the tractor at the lower trailing arms. However, a reverse arrangement can be used wherein the couplng arm is attached at points between the tractor and implement below the attachment of the tractor to the implement from the lower trailing arms.

DETAILED DESCRIPTION OF THE DRAWINGS

For a more complete understanding of the present invention, and for further details and advantages thereof, reference is now made to the following description taken in conjunction with the accompanying drawings in which:

FIG. 1 illustrates a side elevation partially broken away of the coupler of the present invention mounted between a tractor and implement;

FIG. 2 is a top plan view of the coupler illustrated in FIG. 1;

FIG. 3 is a perspective view of the coupler of the present invention;

FIG. 4 is a diagrammatic view showing the relationship of the tractor and implement corresponding to the position of the coupler in FIG. 1;

FIG. 5 is a side elevation of the coupler of the present invention mounted between a tractor and implement and in an alternative position to that illustrated in FIG. 1;

FIG. 6 is a diagrammatic view showing the relationship of the tractor and implement corresponding to the position of the coupler illustrated in FIG. 5; and FIG. 7 is an alternative embodiment of the structure for attaching the upper portion of the coupler to the tractor.

DESCRIPTION OF THE PREFERRED EMBODIMENT

FIGS. 1, 2 and 3 illustrate a side elevation, plan view and perspective view, respectively, of a coupler unit 20 attached between a tractor 22 and a farm implement 24. FIG. 1 is partially broken away so that coupler unit 20 may be more clearly shown.

In FIGS. 1 and 2, only the rear portion of tractor 22 is illustrated. The portion of the tractor shown includes the rear axle hub 30 having a wheel 32 and a tire 34 mounted thereon. The tractor is constructed with a frame 36 supported from axle 30. A pair of pull arms 38 extend rearwardly from frame 36 and are pivotally attached from the frame by appropriate pins 40. The angular relation of each arm 38 relative to frame 36 is controlled by a double arm linkage 42 and a variable link hydraulic cylinder 44. Each double arm linkage 42 includes an adjustable lower arm 48 and a rocker arm 50 conected by a pin 52. The upper end of arm 50 is attached by an appropriate pin 56 to a lug 54 extending from frame 36. The lower end of arm 48 is attached to pull arm 38 intermediate of its ends by an appropriate pin 60.

Each hydraulic cylinder 44 is connected at one end to corresponding arm 50 by a pin 62 and at its opposite end to a lug 64 mounted to frame 36. The connection of the lower end of each hydraulic cylinder 44 to lug 64 is by way of pin 66. A hydraulic line 68 attached to each hydraulic cylinder 44 carries fluid to and from the cylinders to vary the position of rocker arms 50 relative to frame 36. By adjusting the flow of fluid to and from the hydraulic cylinders 44, arms 48 and 50 of linkages 42 may be raised and lowered to control the angular relation of pull arms 38 relative to frame 36.

An upper adjustable length trailing arm 80 is attached to the rearward end of tractor frame 36 at lug plates 82. The connection of trailing arm 80 to lug plates 82 is by a suitable pin 84. Trailing arm 80 is a two component arm which may be adjusted in length as is well known in the art.

As can be seen in FIG. 2, the point of connection at pin 52 of arms 48 and 50 is maintained in a spaced relationship by brace 86. The ends of brace 86 are attached by pins 52 to arms 48 and 50.

Referring to FIGS. 1 and 3, coupler 20 includes a U-shaped frame 90 having an upper bar 92 joined between two downwardly extending transverse legs 94. Legs 94 are attached to upper bar 92 by any suitable means such as welding. Upper bar 92 is square in cross section with one diagonal substantially in line with the longitudinal axis of transverse legs 94. Legs 94 are formed with a general L-shaped configuration each having a protruding foot portion 96. Foot portion 96 has an aperture therethrough for accepting a pin 98 for pivotally attaching foot portion 96 to the rearward end of pull arms 38.

A rearwardly extending hook member 100 is attached to upper bar 92 by any suitable means such as welding and has an upwardly facing receiving trough 101 formed therein. Hook member 100 is attached intermediate of the ends of bar 92. An upwardly extending lug 102 is also attached from upper bar 92 by any suitable means such as welding. Lug 102 has an aperture therethrough.

Coupling arms 110 are pivotally attached to lug 102 by a pin 112. Pin 112 is inserted through an aperture in arms 110 intermediate of the ends thereof and through the aperture formed in lug 102. The upper end of coupling arms 110 is pivotally attached by a pin 114 to trailing arm 80 through an aperture in the upper end of coupling arms 110. The attachment of coupling arms 110 to trailing arm 80 is at the end of arm 80 remote from its attachment to tractor 22. As can be seen in FIGS. 1 and 3, each coupling arm 110 is formed with a V-notch 120 corresponding to the configuration of the surfaces 92a and 92b of upper bar 92.

Implement 24 includes lower attachment lugs 120, each having an aperture therethrough for receiving a connecting pin 122 for attachment of lugs 120 to legs 94 of coupler unit 20. Implement 24 also includes a pair of upper attachment lugs 124 for receiving a connecting pin 126 for attachment of lugs 124 to hook member 100. Pin 126 is threaded through apertures in lugs 124 and engages trough 101 of hook member 100.

The attachment of implement 24 to coupler unit 20 is a rigid connection which fixes the angular position of implement 24 to frame 90 of coupler unit 20. As can be seen from FIG. 1, the connection of coupler unit 20 to tractor 22 is by means of pins 98 to pull arms 38 and by means of pin 114 to upper trailing arm 80. Upper trailing arm 80 is free to pivot at its attachment point to lug plates 82 at pin 84. Further, the upper end of frame 90 of coupler unit 20 is free to pivot at pin 112.

Farm implement 24 may be of any of a number of implement units pulled by a tractor. The present invention is particularly advantageous in attaching rotatable plow units to a tractor in that the three point connection provided by the present invention assures sufficient torsional stability required when such a plow unit is rotated from one position to another about an axis substantially in line with the direction of travel of the plow.

In operation of the tractor and implement using the coupler unit of the present invention, pull arms 38 are set at a desired angular relation relative to tractor 22 by adjustment of hydraulic cylinder 44 to control arms 48 and 50 of linkage 42. Setting the relationship of pull arms 38 relative to tractor 22 sets the height of the rearward end of pull arms 38 and thus the height of the forward end of implement 24. As illustrated in FIG. 4, the rearward end of implement 24 is supported by an adjustable tire assembly 130 to control the relationship of the plow or other soil treating apparatus relative to the soil.

The present coupling unit also permits variation of the angular relationship between the implement and the tractor as when the tractor and implement traverse an irregular terrain. This is accomplished by permitting relative movement between the upper end of frame 90 of coupler unit 20 and the rearward end of upper trailing arm 80. This relative movement is permitted while maintaining a connection therebetween. For example, as the tractor and implement connected thereto traverse a valley as depicted in FIG. 4, the upper end of frame 90 rotates forwardly about the attachment of frame 90 to pull arms 38. As viewed in FIG. 1, this results in a counterclockwise rotation of coupling arms 110 about their connection to frame 90 at pin 112. As a result, the notch area 120 of coupling arms 110 moves away from surfaces 92a and 92b of upper bar 92.

Alternatively, as the tractor and implement combination traverses a crest (FIG. 6), implement 24 rotates downwardly relative to tractor 22 resulting in the rearward rotation of frame 90 about its connection to pull arms 38. As a result, the upward extending lug 102 attached to bar 92 rotates rearwardly relative to upper trailing arm 80 causing the clockwise rotation of coupling arm 110 (as viewed in FIG. 1) about pin 112. Thus, coupling arm 110 rotates at its spaced points of connection between upper extending lug 102 of frame 90 and upper trailing arm 80 to provide relative movement between the upper portion of implement 24 and tractor 22. This relative rotation is provided while maintaining a connection at both the lower trailing arms and upper trailing arm of the tractor. Thus, the torsional stability provided by such a three point connection is maintained while permitting angular rotation between the implement and the tractor.

Referring to FIG. 5, there is illustrated in an enlarged view the coupler unit 20 showing the position of coupling arms 110 relative to bar 90 corresponding to the relative position of the implement and tractor illustrated in FIG. 6. In this relationship, implement 24 has rotated downwardly relative to tractor 22, and coupler arms 110 have rotated such that notch area 120 approaches surfaces 92a and 92b of upper bar 92. The relationship between the components of the present invention are designed such that arms 110 do not normally rotate to engage bar 92. Rather, in the terrain normally encountered, rotation of the implement 24 relative to tractor 22 will not be so great as to result in the engagement of coupling arms 110 against bar 92. However, the bar 92 acts as a limiter for its rotation of coupling arms 110 by arresting the rotation of arms 110 when they engage surfaces 92a and 92b of bar 92.

As can be seen in FIG. 1, adjusting the length of trailing arm 80 can be made to properly compensate for the particular terrain being worked. If the terrain being worked is primarily in a valley area, bar 80 would be shortened to permit variations from this norm. Alternatively, if hill area is primarily worked bar 80 is lengthened to center arms 110 for the normally operating configuration.

The farm implement may be raised off of the ground as when the implement is being moved to and from the field by actuating hydraulic cylinders 44 to raise arm linkages 42 and lift pull arms 38. As the ends of pull arms 38 attached to coupler unit 20 are raised, legs 94 will rotate rearwardly about pins 98 until coupling arms 110 bottom out against bar 92. As pull arms 38 are lifted further, implement 24 will be raised above the ground surface.

While the present invention has been illustrated as including a coupler unit having a frame 90 with rearwardly extending hook member 100 and upwardly extending lug 102 attached between the farm implement and the tractor, it will be understood that the farm implement may be attached directly to the lower and upper trailing arms of the tractor with the insertion of coupling arms 110 between the connection of the upper trailing arm 80 and the upper portion of implement 24 as represented at lugs 124. In this embodiment, lug 120 would be connected directly to the rearward end of pull arms 38 and the upper attachment lugs 124 would be attached directly to coupling arm 110 at pin 112. This arrangement eliminates frame 90 as well as rearwardly extending hook member 100 and upwardly extending lug 102. Similarly, the engagement surfaces 92a and 92b provided by upper bar 92 could be formed directly on lugs 124 to serve the same function as heretofore described with respect to bar 92.

Therefore, the present invention provides a unit for coupling a tractor having a three point hookup including two lower trailing arms and an upper trailing arm extending rearwardly from the tractor to a farm implement. The unit includes a frame pivotally attached between the farm implement and the lower rearwardly extending arms of the tractor and structure adjacent the upper portion of the frame for releasably engaging a second point on the farm implement. A coupling arm is pivotally attached to the upper portion of the frame at a first point and pivotally attached at a second point spaced from the first point to the end of the upper trailing arm extending from the tractor. This arrangement permits variation of the angular relation of the implement to the tractor, as when the tractor and implement traverse a crest or valley, while maintaining the stability provided by a three point connection between the tractor and the implement.

FIG. 7 illustrates an alternative embodiment of the invention illustrated in FIGS. 1–6. Because of many of the elements in this alternative embodiment are similar or identical to components in the embodiment illustrated in FIGS. 1–6, corresponding or like elements are designated with the same numeral as used in the embodiment illustrated in FIGS. 1–6 with the added designation prime ('). In the alternative embodiment illustrated in FIG. 7, a stationary plate 140 is substituted for coupling arm 110. Plate 140 is attached to bar 92' and is formed with circular aperture 142 therethrough. Upper trailing arm 80' extends from tractor 22 through aperture 142 and a disc 144 is attached to the end of bar 80 of upper trailing arm 80' on the side of plate 140 remote from tractor 22'. A compression spring 146, shown in phantom in FIG. 7, may be positioned between plate 140 and disc 144 and around upper trailing arm 80' if desired, although the presence of a spring 146 is not mandatory to the successful operation of the alternative embodiment of the present invention.

The operation of the coupling unit illustrated in the embodiment of FIG. 7 is substantially identical to that illustrated in FIGS. 1–6. As the tractor and implement traverse a valley, the upper end of frame 90' rotates forwardly about the attachment of frame 90' to the pull arms extending from the tractor. This results in the movement of plate 140 relative to arm 80' and toward tractor 22'. Alternatively, as the tractor and implement traverse a crest, frame 90' rotates rearwardly about its connection to pull arms extending from the tractor. As a result, plate 140 moves rearwardly along arms 80' away from tractor 22' and toward disc 144. Where a spring 146 is engaged between disc 144 and plate 140, the spring will be compressed to resist the relative movement of the implement to the tractor as the rotation progresses. Thus, this embodiment also permits relative rotation between the implement and tractor while maintaining a connection between the implement and tractor at both the lower pull arm and upper trailing arm of the tractor.

Although preferred embodiments of the invention have been described in the foregoing detailed description and illustrated in the accompanying drawings, it will be understood that the invention is not limited to the embodiments disclosed, but is capable of numerous rearrangements, modifications, and substitutions of parts and elements without departing from the spirit of the invention. The present invention is therefore intended to encompass such rearrangements, modifications and substitutions of parts and elements as fall within the scope of the appended claims.

What is claimed is:

1. Apparatus for coupling a tractor having a rear axle to a trailing implement comprising:
   first means for rotatably attaching first attachment points of the implement to first attachment points of the tractor, and
   floating coupling means for attaching a second attachment point of the tractor to a second attachment point of the implement to allow the implement to be freely rotatable about the first attachment points of the implement to the tractor with respect to the rear axle of the tractor, said floating coupling means including an upwardly extending ear attached to said implement with a pivot point thereon, and a coupling arm pivotally attached to the pivot point of said upwardly extending ear at an intermediate point and pivotally attached to the second attachment point of the tractor, said coupling arm extending beyond the rotatable attachment to said upwardly extending ear and adjacent to the upper portion of said implement whereby said extension rotates toward said upper portion when the implement rotates downwardly about the first attachment points of the implement to the tractor.

2. The apparatus of claim 1 wherein said first means for rotatably attaching the implement to the tractor includes a pair of pin connections as the first attachment points on said tractor, and wherein said means for rotatably attaching said coupling arm to the tractor and to the implement, respectively, include pin connections with said connections being above the position of the pin connections of said first means.

3. The apparatus of claim 1 wherein said coupling arm is attached to the implement above the point of attachment of the implement to the tractor by said first means.

4. An apparatus for coupling a tractor having a three point hookup including two lower trailing arms extending rearwardly from the tractor and an upper trailing arm extending rearwardly from the tractor to a trailing implement comprising:
   a frame pivotally attached between the implement and the lower rearwardly extending arms of the tractor,
   means adjacent the upper portion of said frame for releasably engaging the implement said means including an upwardly extending ear attached to said frame and including a pivot point, and
   a coupling arm pivotally attached to the pivot point of said upwardly extending ear at an intermediate point and pivotally attached at a second end to the upper trailing arm extending from the tractor, said coupling arm extending beyond the rotatable attachment to said upwardly extending ear and adjacent to the upper portion of said frame whereby said extension rotates toward said upper portion when the implement rotates downwardly about the point of connection of the frame to the lower trailing arms from the tractor.

5. The coupling apparatus according to claim 4 wherein said frame comprises a U-shaped structure having an upper bar connected between two parallel legs extending transversely therefrom, the end of said transversely extending parallel legs remote from said upper bar being attached between the implement and the lower trailing arms from the tractor, and
   wherein said means adjacent the upper portion of said frame includes a rearwardly extending ear attached to said frame for connection to the implement at a point removed from the connection of the implement to the ends of the transversely extending legs.

6. Apparatus for coupling a tractor having a rear axle to a trailing implement comprising:
   a pair of lower trailing arms pivotally extending from lower attachment points of the tractor toward the implement,
   attachment means for pivotally attaching the outboard ends of said lower arms to lower attachment points of the implement, and
   floating coupling means for attaching an upper attachment point of the tractor to an upper attachment point of the implement to allow the implement to be freely rotatable about the lower attachment points of the implement to the tractor with respect to the rear axle of the tractor, said floating coupling means including an upwardly extending ear attached to said implement with a pivot point, and a coupling arm pivotally attached to the pivot point of said upwardly extending ear at an intermediate point and pivotally attached to the upper attachment point of the tractor, said coupling arm extending beyond the rotatable attachment to said upwardly extending ear and adjacent to the upper portion of said implement whereby said extension rotates toward said upper portion when the implement rotates downwardly about the lower attachment points of the implement to the tractor.

7. Apparatus for coupling a tractor to a trailing implement comprising:
   first means for rotatably attaching the implement to the tractor at a first attachment point,
   a coupling arm,
   second means for attaching one end of said arm to the tractor,
   third means for rotatably attaching an intermediate point of the arm to the implement,
   a limiter bar attached intermediate of said third means and said first means with said second means being positioned on the opposite side of said third means form said limiter bar, and
   wherein said coupling arm extends beyond said third means for rotatable engagement against said limiter bar when said implement rotates downwardly about said first means.

8. Apparatus for coupling a tractor to a trailing implement comprising:
   a pair of lower trailing arms extending from the tractor toward the implement,
   an upper arm extending from the tractor toward the implement,
   attachment means for attaching the ends of said lower arms to the implement,
   a coupling arm rotatably attached at one end to said upper arm and rotatably attached at an intermediate point to the farm implement at a point spaced from the point of connection of said lower trailing arms to the implement, and a limiter bar attached to the implement adjacent the point of connection of said coupling arm to the farm implement at the intermediate point on said coupling arm, and wherein said coupling arm extends beyond the connection of said coupling arm to the implement such that the extension of said coupling arm rotates toward said limiter bar as the implement rotates downwardly about the connection to the lower trailing arms.

* * * * *

UNITED STATES PATENT AND TRADEMARK OFFICE
CERTIFICATE OF CORRECTION

PATENT NO. : 4,232,878
DATED : November 11, 1980
INVENTOR(S) : George E. Moore, Jr.

It is certified that error appears in the above-identified patent and that said Letters Patent are hereby corrected as shown below:

```
Column 2, line 17, change "are" to --is--.
Column 4, line 21, change "V-notch 120" to --V-notch 119--
Column 5, line 12, change "upward" to --upwardly--;
          line 28, change "90" to --92--;
          line 34, change "are" to --is--;
          line 46, change "bar" to --arm--;
          line 48, change "bar" to --arm--.
Column 6, line 30, after "Because" delete "of";
          line 40, change "22" to --22'--;
          line 41, change "bar 80" to --arm 80'--;
          line 42, change "trailing arm 80'" to --trailing
          arm 80--.
Column 8, line 54, change "form" to --from--.
```

Signed and Sealed this

Twenty-fourth Day of February 1981

[SEAL]

Attest:

RENE D. TEGTMEYER

Attesting Officer

Acting Commissioner of Patents and Trademarks